May 7, 1946.　　　　J. M. TYRNER　　　　2,399,771
MAGNETIC ARC STARTER FOR WELDING MACHINES

Filed April 21, 1945

INVENTOR
JOSEPH M. TYRNER
BY
ATTORNEYS

Patented May 7, 1946

2,399,771

UNITED STATES PATENT OFFICE 2,399,771

MAGNETIC ARC STARTER FOR WELDING MACHINES

Joseph M. Tyrner, New York, N. Y., assignor to Air Reduction Company, Incorporated, a corporation of New York Application April 21, 1945, Serial No. 589,609

4 Claims. (Cl. 314—66)

This invention relates to improvements in devices used in connection with automatic arc welding machines for establishing the arc between the electrode and the work.

Automatic welding machines for carrying out various welding operations are commonly provided with a support for holding the electrode and for progressively moving the electrode downwardly toward the work under the control of voltage-responsive mechanism or other types of control devices which feed the electrode support or holder toward the work as the electrode is consumed. Devices have also been provided in connection with the support or electrode holder for establishing the arc between the electrode and the work which is to be welded.

The primary object of the present invention is to provide an improved automatic device of simplified construction which is adapted to draw the electrode away from the work and to establish the arc for effecting the welding operation.

Another object of the invention is to provide a device of the type referred to which is included as a part of the electrode support and which is of simple and rugged construction.

A further object of the invention is to provide an automatic device of the type referred to which has a delayed action adapted to permit the flow of a heavy current from the electrode to the work before the electrode is drawn therefrom in order to establish the proper welding arc.

An improved feature of the present invention is the provision of an automatic device of the type described which includes a bracket attached to the electrode support of a welding machine, for example, an automatic welding machine, the bracket comprising a pair of substantially spaced arms projecting in the general direction of the support, a magnet mounted in the bracket between the arms and spaced therefrom, the magnet including a winding of large wire, one end of which is adapted to be connected to a source of welding current, a cross-bar having an armature member on one side extending opposite the end of said magnet, a movable guide means for securing the ends of the cross-bar to the respective arms of the bracket and adapted to permit limited movement of the armature toward and away from the magnet, an electrode holder secured to the under side of the bar, and a conductor for connecting said winding to the electrode holder.

Another feature of the invention is the provision of a magnet for the automatic device referred to which is provided with three pole pieces projecting in the same direction as that of the arms of the bracket and in which a winding of large wire is provided around the central pole of the magnet. According to a preferred construction, the three poles of the magnet are mounted in line with the arms of the bracket, the arms projecting slightly beyond the ends of the poles and being turned in toward each other to provide parallel bracket sections on each side of the magnet which serve as guide means for the cross-bar. In this preferred construction, the armature is preferably a long heavy bar extending across the ends of the three magnet poles, and the guide means comprises a bolt attached to each end of the cross-bar and extended through holes in the spaced horizontal sections of the bracket arms. Means is also provided for adjusting the range of movement of the armature with respect to the ends of the poles of the magnet thereby controlling the length of the arc between the electrod and the work.

Other features, objects and advantages of the improved device of the present invention will be apparent to those skilled in the art from the following more detailed description thereof, taken in connection with the accompanying drawing forming a part of this application.

Figure 1:
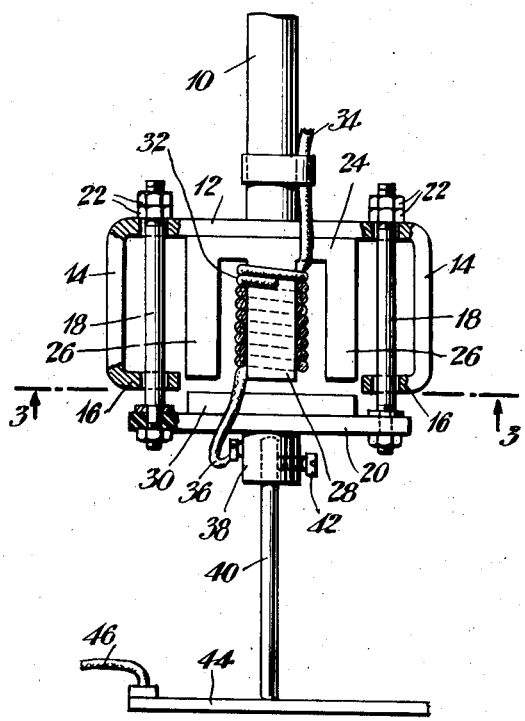
Fig. 1 is a vertical front view, partly in section, of a device for automatically establishing an arc between a welding electrode and the work to be welded, constructed in accordance with the features of the present invention.
Figure 2:
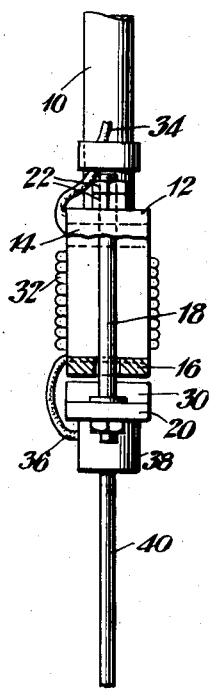
Fig. 2 is an end view partly in section of the device shown in Fig. 1.
Figure 3:
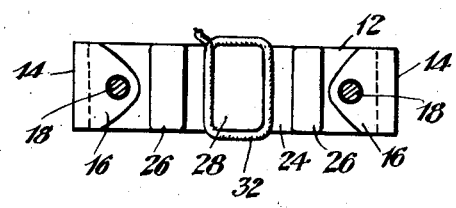
Fig. 3 is a horizontal sectional view taken on the line 3—3 of Fig. 1 in the direction of the arrows.

Referring to the drawing, the apparatus of the present invention comprises a supporting member 10 which may be a part of a conventional automatic or other welding machine and which may be moved downwardly by such a machine under any type of control for feeding an electrode held thereby toward the work to be welded as the electrode is consumed. The supporting member 10 may be mounted in vertical position or at any other angle, depending upon the design of the welding machine. Since the present invention is not concerned with the particular welding apparatus for operating the support 10, the drawing and description does not include such apparatus. It is to be understood, however, that the support 10 may be moved at a controlled rate with respect to the work to be welded, as for example along a seam, or the work may be moved while the support and the electrode held thereby is kept in a fixed location, except for the slow axial movement toward the work as the electrode is consumed.

A bracket member 12 of bar stock, as indicated, is attached to the lower end of the support 10. The bracket includes the upper horizontal section, as indicated, and substantially spaced downwardly extending integral arms 14 which terminate in horizontal inwardly extending integral flanges 16. The arms 14 extend generally in a direction parallel to the support 10 while the upper and lower horizontal sections of the bracket are provided with holes inwardly of the arms 14 for receiving movable guide members or bolts 18. The lower ends of the bolts 18 are attached, respectively, to the opposite ends of a cross-bar 20 which is mounted parallel to the flanges 16, the bolts being attached in fixed relation to the bar by means of a nut and washer, as indicated. The upper ends of the bolts 18 are each provided with a pair of nuts 22 so that they may be locked to the bolts 18.

A magnet 24 is symmetrically attached to the under side of the bracket 12, the core of which comprises two integral end poles 26 and an integral central pole 28. The magnet has approximately the width of the stock of the bracket 12, the poles being mounted in alignment with the bracket arms 14 and all projecting the same distance from the upper part of the bracket. The projecting ends of the poles 26 and 28 extend between the flanges 16 to the position indicated in Fig. 1. The cross-bar 20 carries an attached armature bar 30 which is of the same width as the poles of the magnet and is approximately the same length as the magnet is wide. The magnet 24 includes a winding 32 which comprises only a few turns of a relatively large insulated wire which is provided with a conductor 34 which is connected to a source of welding current supply, not shown. The opposite end of the winding 32 is provided with a conductor 36 which is electrically connected to a metal electrode holder 38, attached to the bottom of the cross-bar 20. The holder 38 is drilled centrally to receive a welding electrode 40 which is held in place by means of a screw 42.

The electrical circuit through the apparatus, as shown, includes the conductor 34 which is connected to a transformer, welding generator or other suitable source of welding current, from which current flows through the turns of the winding 32, the conductor 36, holder 38, and electrode 40, to a work piece 44 which is in turn connected back to the source of current by means of a conductor 46. To prevent the welding current from passing from the electrode holder 38 back through the support, the holder may be insulated from the cross-bar 20, or this bar may be made of insulating material, as indicated in Fig. 1.

In the operation of the device of the present invention, a welding machine to which the device is attached is operated to lower the support 10 until the projecting end of the electrode 40 comes in contact with the work 44, as shown in Fig. 1. As the welding current flows through the winding 32 and the electrode 40 into the work 44, the magnet 24 is energized, and after some time lag, the armature 30 is drawn up into contact with the poles of the magnet 24. This movement of the armature 30 lifts the electrode 40 out of contact with the work 44 and draws an arc between the electrode and the work. However, the armature 30 is not drawn up immediately upon the passage of the current through the winding 32 because of the time lag involved in building up a magnetic field in the magnet provided with the small number of turns, and because of the inertia of the armature and the other movable parts of the device connected therewith. This delay permits the flow of a heavy current from the electrode 40 to the work before the electrode is drawn up.

The length of the arc desired between the end of the electrode 40 and the work 44 is determined by the clearance between armature 30 and the ends of the pole pieces 26 and 28 of the magnet. The correct distance for a particular welding operation may be obtained by adjusting the spacing between the armature 30 and the pole pieces of the magnet by means of the nuts 22 on the bolts 18.

The automatic device as described above provides a very simple automatic construction for drawing the electrode away from the work and establishing the desired arc for effecting a welding operation. It will be noted that the bolts 18, which serve as guide members and which also serve for adjusting the spacing of the armature from the poles of the magnet, are loosely mounted in the bracket arms 14 in parallel arrangement with the support 10. The spaced aligned holes for each bolt in the bracket 12 provide a straight line guide for the bolts 18 and the electrode 40. The electrode 40 is mounted so that it is in substantial alignment with the support 10.

When the welding current is not turned on, the weight of the bar 20, armature 30 and other connected elements causes the armature to move away from the ends of the poles of the magnet, and the assembly is carried by the nuts 22 which engage the upper horizontal surface of the bracket 12. If desired, light coil springs may be included around the bolts between the flanges 16 and the bar 20, to keep the mechanism in its extended position, except when the current is turned on.

The use of a relatively long bar 20, the substantially spaced guide arms and the retaining bolts 18 provide a retracting mechanism of simple construction and one which is free of any reasonable possibility of jamming. The guide bolts are so arranged that there is little possibility of their becoming bound in the bracket. Furthermore, the magnet and armature arrangement is such that there is mere face-to-face contact with no possibility of the armature becoming wedged in the magnet or in the bracket.

From the foregoing description it will be apparent that certain modifications may be made in the structure and arrangement of the various parts of the device without materially changing its function or operation. Such changes are contemplated as coming within the scope of the present invention, as defined by the appended claims.

What is claimed as new is:

1. In an arc welding apparatus, a device for automatically establishing an arc between a welding electrode and the work to be welded, comprising a bracket having a pair of spaced projecting substantially parallel arms, a magnet mounted in the bracket between the arms in spaced relation thereto, said magnet including three spaced pole pieces projecting in the same direction as said arms, a winding of large wire around the central pole of said magnet one end of which is adapted to be connected to a source of welding current, a cross-bar having an attached armature member extending across the ends of said pole pieces, movable guide means for securing the ends of said bar to the respective arms of the bracket, an electrode holder secured to the under side of said bar, and a conductor connecting the other end of said winding to the electrode holder.

2. In an arc welding apparatus, a device for automatically establishing an arc between a welding electrode and the work to be welded, comprising a bracket having a pair of spaced projecting substantially parallel arms, a magnet mounted in the bracket between the arms in spaced relation thereto, said magnet including a pole piece projecting in the same direction as said arms, a winding of large wire around the pole of said magnet one end of which is adapted to be connected to a source of welding current, a cross-bar having an attached armature member extending across the end of said pole piece, a movable guide member secured to each end of said bar, said guide members being slidably connected to the respective arms of the bracket, an electrode holder secured to the under side of said bar, and a lead wire connecting the other end of said winding to the electrode holder.

3. In an arc welding apparatus, a device for automatically establishing an arc between a welding electrode and the work to be welded, comprising an electrode mounted in a holder attached to the under side of a cross-bar, an armature bar attached to the upper side of said cross-bar, a bracket mounting a magnet, guide means interconnecting the ends of said cross-bar and bracket and adapted to mount said armature opposite the pole of said magnet and in limited movable relation thereto, a support attached to said bracket and adapted to be carried by a welding apparatus, said magnet including a winding of large wire interconnected between a welding current source and the electrode, whereby said electrode is drawn up by the magnet after the welding current is turned on.

4. In an arc welding apparatus in which a welding electrode is contacted with the work to be welded and then supported adjacent the work during the welding operation, a device for automatically drawing the electrode away from the work and for establishing an arc between the electrode and the work, comprising an electrode holder attached to the under side of a cross-bar, an armature attached to the upper side of said cross-bar, guide elements attached to each end of the bar and spaced from the armature, a bracket having side members adapted to receive said guide elements, a magnet mounted between the side elements of said bracket opposite said armature, said magnet including a winding having a relatively small number of turns of large wire interconnected between a source of welding current and the electrode holder, said magnet and winding being arranged to provide a time lag in the build-up of the magnetic field after the welding current is turned on whereby a heavy current flows directly from the electrode to the work when the electrode is initially in contact therewith.

JOSEPH M. TYRNER.